May 12, 1959 H. M. GEYER ET AL 2,886,008
LOCKING ACTUATOR AND VALVE MECHANISM THEREFOR
Filed Aug. 3, 1953 3 Sheets-Sheet 3
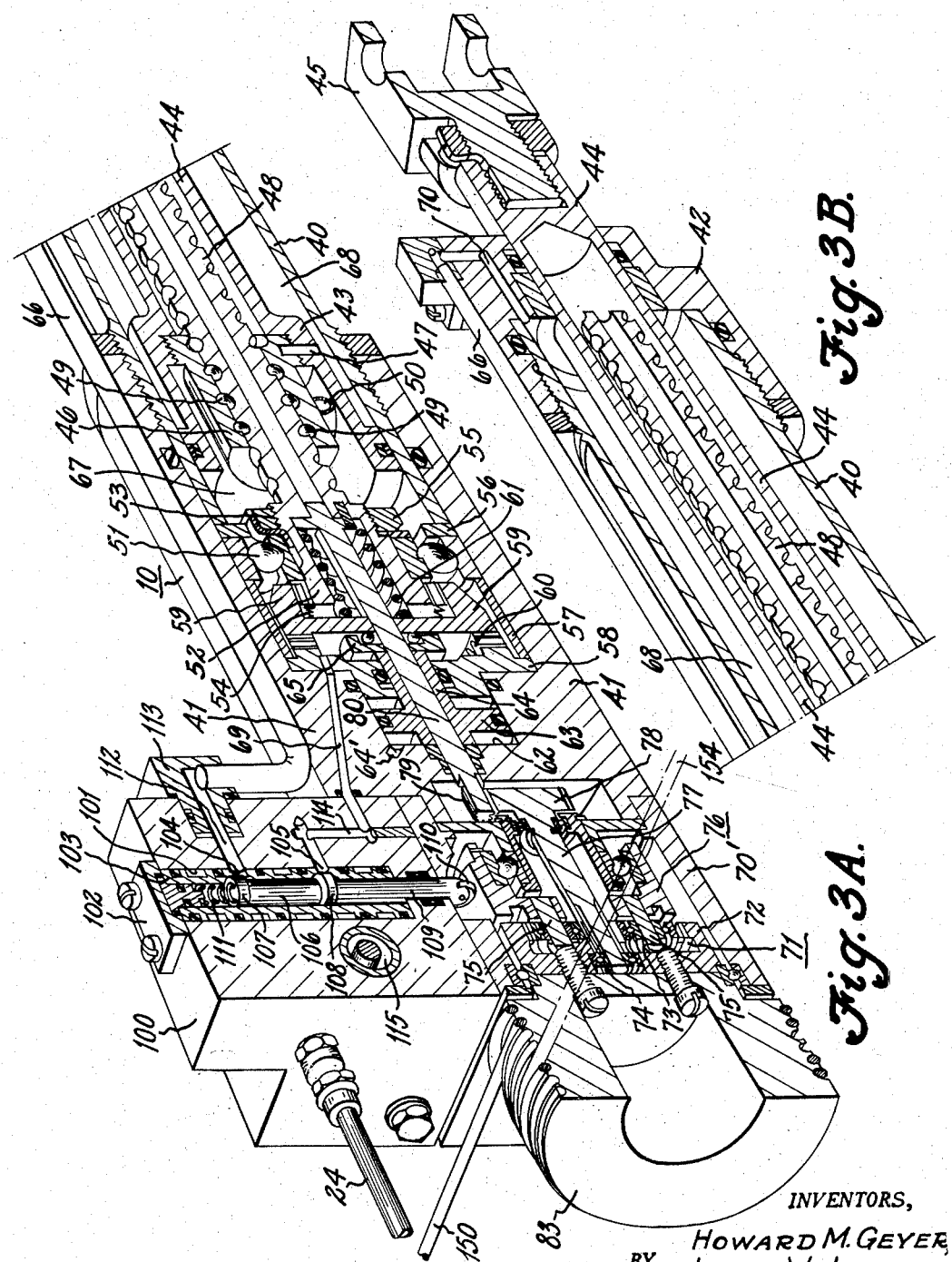
INVENTORS,
HOWARD M. GEYER,
JAMES W. LIGHT
BY Craig V. Morrow
ATTORNEY

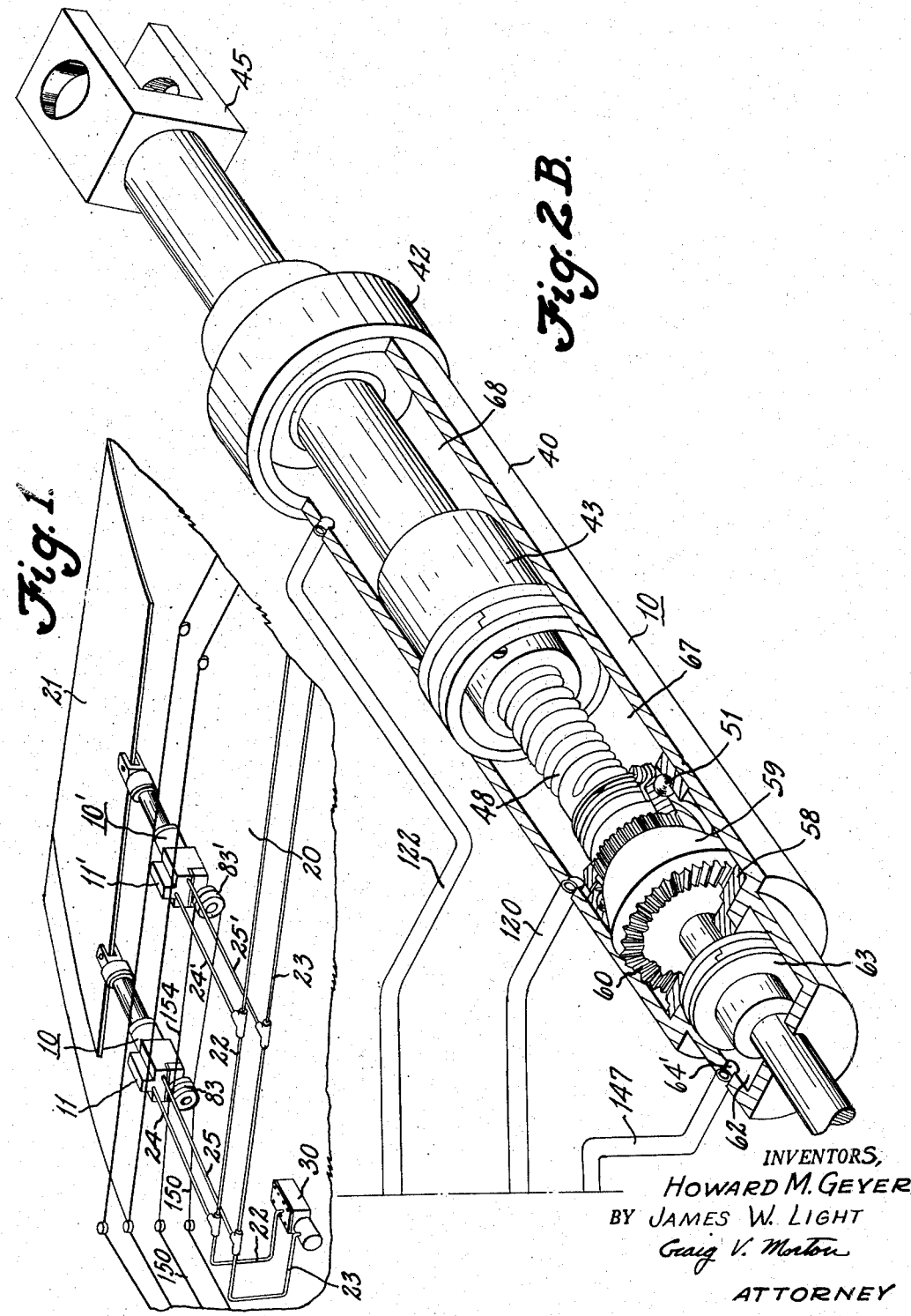

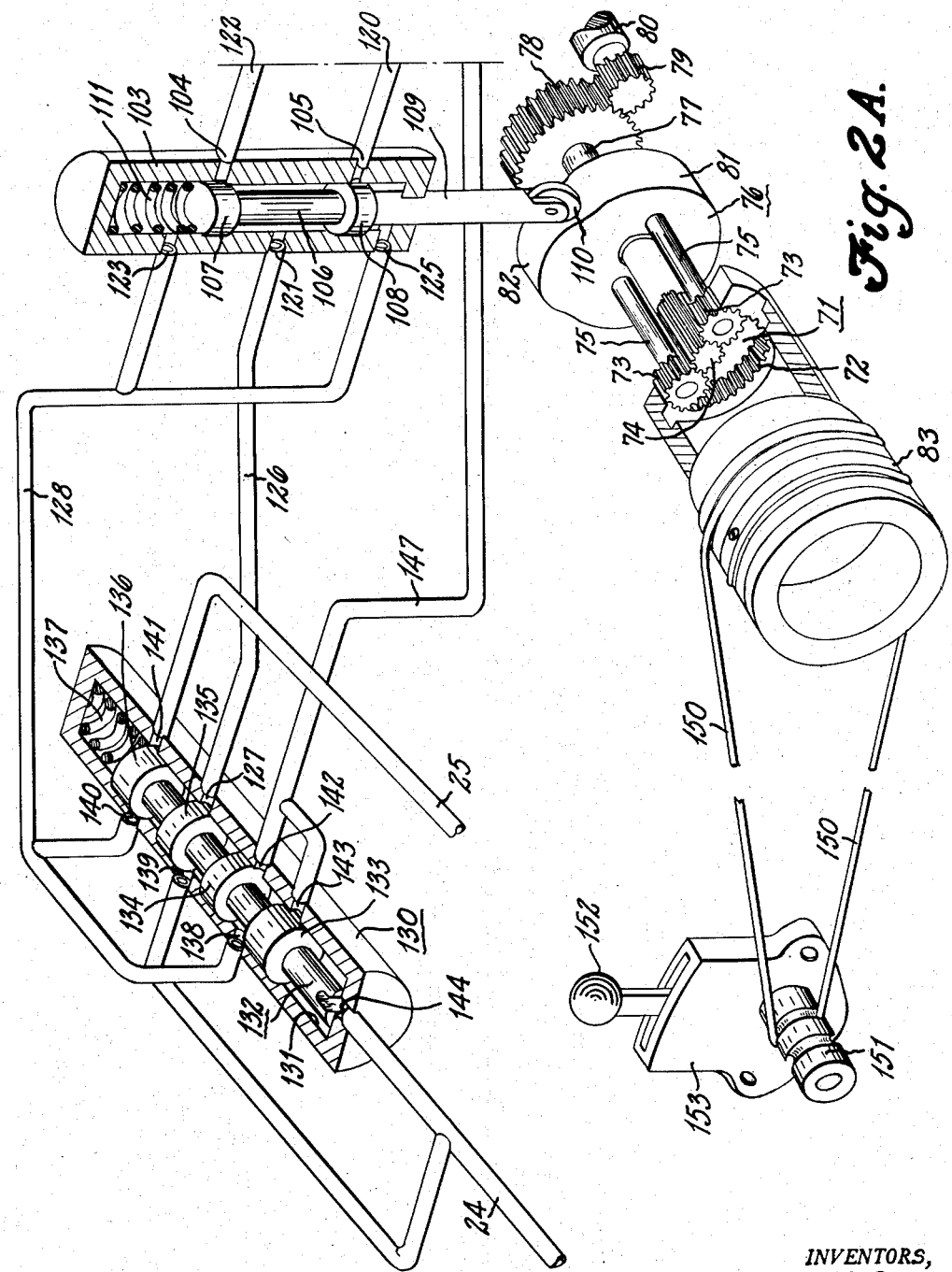

United States Patent Office 2,886,008
Patented May 12, 1959

2,886,008

LOCKING ACTUATOR AND VALVE MECHANISM THEREFOR

Howard M. Geyer, Dayton, and James W. Light, Greenville, Ohio, assignors to General Motors Corporation, Detroit, Mich., a corporation of Delaware Application August 3, 1953, Serial No. 371,824

5 Claims. (Cl. 121—41)

The present invention pertains to means for controlling a plurality of actuators, and more particularly to means for obtaining equal movement of a plurality of fluid pressure operated linear actuators.

Heretofore, a plurality of fluid pressure operated linear actuators have been synchronized by a power transmitting interconnection between the actuators such that the load associated with the actuators was equally divided between the actuators and the travel of the movable actuator elements was positively maintained in synchronism. In addition fluid pressure operated actuators have been synchronized by valve means operable to disrupt the application of fluid pressure to one actuator of a multiple actuator system, if the one actuator is out of synchronism with the other actuator, or actuators. However, in some instances resort cannot be had to either of the aforegoing expedients as only the adjusted position of the multiple actuator installation need be the same, and independent movement of each actuator is desired. Accordingly, among our objects are the provision of means for controlling the operation of a plurality of actuators; the further provision of means for assuring equal movements of a plurality of fluid pressure operated linear actuators; and the still further provision of unitary control means for effecting equal movement of a plurality of fluid pressure operated actuators.

The aforementioned and other objects are accomplished in the present invention by providing independently operable follow-up valve means for each actuator to assure like, or equal, movement of a plurality of actuators. Specifically, it should be noted that no power transmitting interconnection is provided between adjacent actuators of the multiple actuator installation. Generally, each actuator is of the self-locking, fluid pressure operated type similar to the actuator disclosed and claimed in copending application, Serial No. 278,844, filed February 22, 1952, now Patent 2,643,642 in the name of Howard M. Geyer, and includes a cylinder having mounted therein a reciprocable piston capable of fluid pressure actuation. The piston includes a rod extending through an end wall of the cylinder for connection to a load device, which precludes rotation of the piston relative to the cylinder. The piston carries a non-rotatable threaded member, which operatively engages a rotatably supported threaded element within the cylinder. The rotatably supported element is operatively associated with locking means of the serrated, or toothed type, the locking means normally preventing rotation of the element and, consequently, preventing reciprocable movement of the piston within the cylinder. The locking means are maintained in the engaged, or locked, position by resilient means and may be actuated so as to free the threaded element, or member, for rotation by fluid pressure operated releasing means. As disclosed herein, pressure fluid is admitted to the lock releasing means so as to permit relative rotation between the element and the member constrained for linear movement with the piston, at all times when a predetermined pressure potential exists in a pressure fluid supply conduit.

The rotatable element of the actuator is operatively connected to the sun gear of a planetary gear set. The planetary gear set also includes a plurality of planet pinions and a reaction member, or ring gear. The stub shafts of the planet pinions are mounted in a carrier, which partakes the form of a cam having a single rise and dwell thereon. The ring gear of the planetary gear set is operatively connected with a rotatable drum mounted exteriorly of the actuator cylinder.

Each actuator also includes a control valve assembly comprising a reciprocable valve element, which cooperates with a fixed porting sleeve. The valve element controls the application of pressure fluid to opposite sides of the piston within the cylinder, and when the valve element is in the neutral, or port closing position, pressure fluid is applied to neither side of the actuator piston and the actuator is effectively locked by the fluid trapped within the cylinder chamber.

The actuators are constructed so that a plurality of them may be controlled by a single control lever having operative connection with the rotatable drums of each actuator in the system. Thus, if the operator moves the control lever so as to call for a predetermined actuator movement, the drum of each actuator in the multiple actuator installation will be rotated through a predetermined angular distance, which, in turn, will rotate the ring gear of the planetary gear set throughout the same predetermined angular distance. Thereafter, the ring gear is maintained in the adjusted position. Movement of the ring gear will effect rotation of the planet pinions about the then fixed sun gear and, thus, effect a predetermined angle movement of the planet carrier, which, as aforementioned, comprises a cam having a single rise and dwell thereon. The control valve element includes an extending rod portion carrying a cam follower, which is spring urged into engagement with the surface of the cam such that angular movement of the cam in either direction will effect linear movement of the valve element relative to a valve sleeve. In the neutral position of the valve element, the cam follower assumes a mean position between the rise and dwell of the cam surface. Accordingly, if the ring gear is rotated in one direction, the valve element will be moved upwardly, which, in the embodiment disclosed, will move the actuator piston to a retracted position, and if the ring gear is rotated in the opposite direction, the cam will be moved in the opposite direction and the valve element will move downwardly so as to move the piston to an extended position.

As the drums of adjacent actuators in the multiple actuator installation are operatively interconnected, the ring gears and the planet carriers having the cam surfaces will be moved throughout the same predetermined angular distance, thereby calling for the same movement, whether it be retract or extend, of adjacent actuators. The application of pressure fluid to either the retract or extend actuator chamber, while either the extend or retract chambers are connected to drain, will result in linear movement of the actuator piston towards an extended or a retracted position. Linear movement of the piston within the cylinder is dependent upon relative rotation between the non-rotatable member constrained for linear movement with the piston and the rotatable element within the cylinder. Accordingly, linear movement of the piston will effect rotation of the element which is transmitted to the sun gear of the planetary gear set, in which the ring gear is now fixed. The construction and arrangement of the planetary gear set and of the interconnection between the rotatable element and the sun gear is such that movement of the actuator piston in the direction selected will effect movement of the planet carrier having the cam surface so as to reposition the valve element in the neutral position. When the selected amount of movement has been accomplished by the actuator piston, the valve element will have moved to the neutral position such that the application of pressure fluid to the actuator cylinder is cut off and the actuator is effectively locked by the fluid trapped therein.

It will be appreciated that inasmuch as each actuator in the multiple actuator installation is of identical construction, each actuator will move through the selected distance after which, its respective control valve element will prevent further movement of the actuator piston so that the adjusted position of all actuators in the multiple actuator installation will be the same. Hence, the present invention provides control means for effecting equal, or like, movement of a plurality of actuators, without resort to a power transmitting interconnection therebetween. Moreover, the rate of movement of adjacent actuators is not controlled inasmuch as the only requirement of the system is to achieve like movements. Thus, the pistons of adjacent actuators may travel at different rates, and may assume different positions relative to each other during operation thereof, but movement of all actuator pistons will cease at the same predetermined position.

Further objects and advantages of the present invention will be apparent from the following description, reference being had to the accompanying drawings wherein a preferred embodiment of the present invention is clearly shown, and wherein like numerals denote like parts throughout the several views.

In the drawings.

Fig. 1 is a fragmentary view of a multiple actuator installation for operating an aircraft wing flap, the actuators being constructed according to this invention.

Figs. 2A and 2B represent a composite schematic perspective view, partly in section and partly in elevation, of one of the actuators and the control system for a plurality of actuators, it being understood that the other actuator or actuators are of identical construction.

Figs. 3A and 3B combined represent a longitudinal sectional view, in perspective, of an actuator constructed according to this invention.

With particular reference to Fig. 1, a multiple actuator installation is disclosed for operating a wing flap of an aircraft. The multiple actuator installation generally includes a pair of actuators 10, 10' of identical construction, which will be described hereinafter in detail. The actuator cylinders are attached to supporting structure in a wing 20 by any suitable means, not shown, and the movable portions of the actuators are attached to a pivotally supported wing flap 21. The actuators include valve housings 11 and 11'. The aircraft carries a source of fluid pressure indicated generally by the numeral 30, components of which will be hereinafter described, having a supply conduit 22 and a drain conduit 23, branches of which connect with the valve housings of the actuators. Thus, the valve housing 11 is connected with the supply conduit 22 by means of branch conduit 24 and with drain conduit 23 by branch conduit 25, while valve housing 11' is similarly connected by branch conduits 24' and 25'.

With particular reference to Figs. 3A and 3B, the detailed construction of actuator 10 will be described, it being understood that each actuator in the multiple actuator installation is of identical construction. The actuator 10 includes a cylinder 40, the ends of which are closed by end caps 41 and 42. The end caps threadedly engage an exterior portion of the cylinder 40 and suitable sealing means are provided between coengaging surfaces of the end caps and the cylinder to prevent leakage of fluid from the interior of the cylinder. A cup-shaped reciprocable piston 43 is disposed within the cylinder 40, the piston 43 having fluid-tight engagement with the interior thereof. The piston 43 includes a longitudinally extending integral piston rod 44 that extends through an opening in end cap 42. Suitable sealing means are also provided between coengaging surfaces of the piston rod 44 and the end cap 42 to prevent the loss of fluid from the cylinder. The free end portion of the rod 44 has attached thereto a clevis 45, which may be attached to any suitable load device such as the wing flap 21 shown in Fig. 1.

The piston 43 is adapted for linear movement relative to the cylinder 40 but is restrained against rotation by reason of its connection to the load device. The piston 43 carries a hollow member 46. Member 46 threadedly engages the piston 43 and is positively restrained against rotation relative to the piston by means of a dowel pin 47. The hollow member 46, as shown in Fig. 3A, has formed on the interior surface thereof a spiral groove which may be of semi-circular configuration. The member 46 constitutes the nut component of the well known ball-screw and nut assembly.

The piston rod 44 is formed with a longitudinally extending recess, which is adapted to telescopically receive an element, or shaft, 48 having a spiral groove of semi-circular configuration on its exterior surface. The element, or shaft, 48 forms the screw of the ball, screw and nut assembly and a plurality of balls 49 are disposed in complementary grooves of the nut 46 and the screw 48 to form a threaded connection between the nut 46 and the screw shaft 48. The nut 46 carries a passage 50 through which the balls 49 circulate during relative rotation between the nut and the screw shaft.

The screw shaft 48 is rotatably supported within the end cap 41 by a bearing means 51. As is seen in Fig. 3A, the rotatably journaled end of the screw shaft 48 is formed with an annular flange 52 having a threaded portion 53 and a straight splined portion 54. The threaded portion 53 of the flange 52 receives a nut 55, which urges the inner race of bearing 51 against the straight splined portion 54. The outer race of the bearing 51 is retained in position between the end of cylinder 40 and an interior shoulder of the cap 41 by means of an annulus 56 and a sleeve 57, which abuts a collar 58 to be described. The straight splined portion 54 of the annular flange 52 receives a locking collar 59 having a toothed, or serrated, surface 60 for engagement with a complementary toothed, or serrated, surface on the collar 58. The collar 59 is adapted for linear movement relative to the annular flange 52 of the screw shaft by reason of the straight spline connection therebetween. However, the collar 59 is restrained against rotation relative to the screw shaft 48. The collar 58 is restrained against rotation by any suitable means, such as a dowel pin, not shown.

The collars 58 and 59 constitute the mechanical locking means of the actuator 10 which is conveniently termed self-locking inasmuch as a spring 61 normally urges the complementary serrated portions of the collars into positive engagement. When the serrated portions of collars 58 and 59 are in positive engagement, rotation of the screw shaft 48 relative to the nut 46 is precluded, and since relative rotation between the screw shaft and the nut must be permitted to facilitate linear movement of the piston 43, the piston 43 and the actuator may be considered locked against movement.

The present invention contemplates fluid pressure actuated means for releasing the locking means, or brake, upon the existence of a predetermined pressure potential in the pressure supply conduit. The fluid pressure operated lock releasing means include a cylinder 62 formed within the end cap 41 and having one end wall formed by the collar 58. A piston 63 is disposed within the cylinder 62 for reciprocable movement. In the absence of a predetermined pressure potential in cylinder 62, as applied through passage 64', the spring 61 will urge the locking collar 59 into engagement with the stationary locking collar 58. However, upon the existence of a predetermined pressure potential in the cylinder 62, the piston 63 will move to the right, as viewed in Fig. 3A, thereby moving the collar 59 longitudinally relative to the annular flange 52 and the collar 58 so as to disengage the serrated surfaces of the collars 58 and 59. Movement of the piston 63 to the right effects movement of the collar 59 to the right by means of a hollow rod portion 64 having operative engagement with a thrust bearing assembly 65 supported between the locking collars 58 and 59.

The actuator piston 43 divides the cylinder 40 into an extend chamber 67 and a retract chamber 68. The extend chamber 67 is in fluid communication with a passage 69 in the end cap 41, while the retract chamber 68 communicates with a passage 70 in the end cap 42, which, in turn, has connection with a conduit 66.

The end cap 41 has rigidly attached thereto a gear housing 70' and a valve housing 100. The gear housing 70' contains a planetary gear set indicated generally by the numeral 71, which in the conventional manner comprises a rotatably mounted ring gear, or reaction member, 72, a plurality of planet pinions 73, and a sun gear 74. The planet pinions 73 mesh with the sun gear 74 and the ring gear 72, and are carried by stub shafts 75, which are anchored to a planet carrier 76. The sun gear 74 is rotatably connected to a shaft 77 having attached thereto at one end a spur gear 78. The spur gear 78 meshes with a spur gear 79 formed as an integral part of a shaft 80, which extends into the end cap 41, through the piston 63, the rod 64, the thrust bearing assembly 65, the locking collar 59, and the spring 61 for operative engagement with the screw shaft 48. Thus, rotation of the screw shaft 48 is imparted through the shaft 80, the gears 79 and 78, and the shaft 77 to the sun gear 74.

The exterior surface of the planet carrier 76 is formed as a cam having a dwell 81 and a rise 82, as shown in Fig. 2A. The ring gear reaction member 72 is rigidly connected to a drum 83 having a series of annular grooves on its exterior surface about which flexible cables may be trained.

The valve housing 100 contains a through bore 101 closed by an end plate 102. A porting sleeve 103 is disposed within the bore 101, the sleeve 103 having five sets of circumferentially spaced ports, two sets of which, 104 and 105, are shown in Fig. 3A. The third set of circumferential ports is disposed equal distances between the sets of ports 104 and 105. The fourth and fifth sets are disposed adjacent opposite ends of the sleeve 103. A valve element 106 having spaced lands 107 and 108 cooperating respectively with the sets of ports 104 and 105, is disposed for reciprocable movement within the sleeve. The valve element 106 includes an extending rod portion 109 which extends into the gear housing 70'. The end portion of this rod 109 is provided with a roller 110 which constitutes a follower for the cam surface of the planet carrier 76. The roller 110 is maintained in engagement with the cam surface of the planet carrier 76 by means of a compression spring 111, which engages the end surface of land 107. The set of circumferential ports 104 is connected by a passage 112 to a hollow member 113 having connection with conduit 66. The set of ports 105 is connected by a passage 114 in the valve housing, the passages 114 of the valve housing and 69 of the end cap 41 presenting openings which are interconnected during the assembly of the valve housing to the end cap 41.

With particular reference to Figs. 2A and 2B, the control system will be described in conjunction with the actuator 10. In Figs. 2A and 2B the extend chamber 67 of the actuator is shown connected by a conduit 120 to the control port 105 of the valve sleeve 103, and the retract chamber 68 is shown connected by conduit 122 to control port 104 of the valve sleeve 103. The valve sleeve 103 is shown housing the valve element 106 and having a supply port 121, the counterpart of which is not shown in Fig. 3A. However, it is to be understood that the valve sleeve 103, in Fig. 3A, is also provided with a set of circumferentially spaced supply ports which communicate with the annular channel between lands 107 and 108 or the valve element. The valve sleeve 103 is shown in Fig. 2A as also including a pair of drain ports 123 and 125, the counterparts of which are, likewise, not shown in Fig. 3A. However, it is also to be understood that the valve sleeve in Fig. 3A includes a set of ports adjacent opposite ends of the sleeve, which are connected to a drain passage 115 of the valve housing 100.

The supply port 121, in Fig. 2A, is shown connected by a conduit 126 to a port 127 of a servo actuated valve unit 130. The servo actuated valve unit 130 comprises a housing having a closed bore 131 in which is disposed a plunger 132 having longitudinally spaced lands 133, 134, 135 and 136. The plunger 132 is normally urged to the position shown in Fig. 2A by means of a compression spring 137. The housing of the valve unit 130 includes in addition to port 127, ports 138, 139, 140, 141, 142, 143 and 144. Ports 138 and 140 are connected by branch conduits to a conduit 128 having branch conduits connecting with drain ports 123 and 125 of the valve sleeve 103. Port 141 is connected by conduit 25 to the drain side of a fluid pressure supply, which may be maintained at a minimum back pressure of one atmosphere. Ports 139 and 144 are connected by branch passages to high pressure supply conduit 24 of the fluid pressure source shown in Fig. 1. Ports 142 and 143 are connected by branch conduits to a conduit 147, which is shown connected to the passage 64' of the actuator and the lock release cylinder 62.

The drum 83 is shown connected by means of a flexible cable 150 to a drum 151, which may be rotated upon movement of a control lever 152 within the control quadrant 153. As is shown in Fig. 1, the drums 83 and 83' of adjacent actuators 10 and 10' are interconnected by a flexible cable 154. Structurally, the valve unit 130 is disposed within the valve housing 100.

*Operation*

The pressure supply 30 of Fig. 1 may constitute an electric motor driven pump and a pressure storage chamber. However, the pressure supply forms no part of the present invention except for the fact that pressure fluid is required to effect actuator movement. Upon the existence of a predetermined pressure potential in conduit 24, as viewed in Figs. 2A and 2B, the plunger 132 will move to the right so as to interconnect ports 143 and 144 and block communication between ports 142 and 138. This movement of plunger 132 will also place ports 139 and 127, and 140 and 141 in communication. Assuming valve element 106 is in its neutral position wherein lands 107 and 108 close ports 104 and 105, which neutral position is obtained when the roller 110 is on the medial portion of the cam surface of the planet carrier 76 substantially half way between the rise 82 and the dwell 81, pressure fluid in line 24 will be communicated through line 147 and passage 64' to the lock release cylinder 62. As the system is closed with valve element 106 in the neutral position, the pressure in conduits 25 and 147 will continue to increase until the pressure potential is sufficient to compress the lock engaging spring 61 so as to free the screw shaft 48 for rotation by effecting movement of locking collar 59 out of positive engagement with locking collar 58.

It is to be understood that the pressure potential required to effect movement of the plunger 132 to a position where ports 143 and 144 are interconnected is less than the pressure required to release the locking means. Thus, upon the occurrence of a pressure potential in conduits 24 and 147, sufficient to release the mechanical locking means, the actuator screw shaft 48 is freed for rotation. However, with the valve element 106 in the neutral position, movement of piston 43 is precluded since the valve element 106 traps fluid within the actuator chambers. When the fluid medium employed to operate the actuator is oil, it may be said that with valve element 106 in the neutral position, and the mechanical locking means released by servo actuation of piston 63, the actuator is hydraulically locked. If the operator moves control lever 152 in the control quadrant 153 in one direction from the position shown in Fig. 2A, the actuators will be extended, and if the control lever 152 is moved in the opposite direction, the actuators will be retracted. Movement of the control lever 152 is communicated by a drum 151 in cable 150 to drum 83 of actuator 10, which is, in turn, communicated to drum 83' of actuator 10'.

It is to be understood that any number of actuators may be controlled by the actuator system and the multiple actuator system disclosed embodying two actuators is only by way of example. Rotation of the drums 83 and 83' of adjacent actuators 10 and 10' will effect rotation of the ring gears of the planetary gear sets of adjacent actuators. In the following discussion, the operation of only one actuator will be described, it being understood that each actuator in the installation will operate in an identical manner. Clockwise rotation of drum 83 will effect clockwise rotation of ring gear 72, which, in turn, will cause the planet gears 73 to rotate clockwise about the then fixed sun gear 74 so as to effect clockwise movement of the planet carrier 76. Clockwise movement of the planet carrier 76 will cause the cam follower 110 to move up the cam rise 82 so as to open port 104 to the high pressure fluid supply at port 121, and simultaneously therewith connect port 105 to drain through port 125. Thus, as the mechanical locking means of the actuator have been previously released, the application of pressure fluid through conduit 122 to the retract actuator chamber 68 will effect movement of piston 43 to the left, as viewed in Fig. 2B. The amount of retraction desired by the operator is determined by the amount of clockwise movement of the lever 152 within the quadrant 153. Movement of the piston 43 to the left, as viewed in Fig. 2B, will effect counterclockwise movement of the screw shaft 48 and the shaft 80. Counterclockwise movement of shaft 80 will effect clockwise movement of shaft 77 through the spur gears 78 and 79 so as to effect clockwise movement of the sun gear 74. As the construction and arrangement between the drums of adjacent actuators and the control quadrant is such that movement of the ring gear 72 can only be effected by movement of the drum 83, clockwise movement of the sun gear 74 will effect counterclockwise rotation of the planet pinion 73 relative to the then fixed ring gear 72 so as to effect counterclockwise movement of the planet carrier 76. Counterclockwise movement of the planet carrier 76 will cause the follower 110 to move toward the dwell 81 and when the medial position between rise 82 and the dwell 81 is reached by the cam follower 110, the valve element 106 will again be positioned in the neutral position closing ports 104 and 105 whereupon movement of the piston 43 will cease and the actuator will again be hydraulically locked.

In a similar manner counterclockwise movement of the lever 152 will result in an extending movement of the actuator piston 43 and when the selected movement has been accomplished, the valve element 106 will again return to the neutral position whereby the actuator will be hydraulically locked. If the fluid pressure in supply conduit 24 should fall below a predetermined pressure wherein spring 61 overcomes the pressure applied to lock release cylinder 62, the actuators will be mechanically locked and movement of control lever 152 will not result in actuator movement.

The sequence of events heretofore described in connection with a single actuator will also occur in each of the other actuator, or actuators, of the multiple actuator installation. Accordingly, if the operator chooses to extend each actuator of the multiple actuator installation a predetermined amount, the control valve elements of each actuator will be positioned by their respective cams through the planetary gear set, and will be repositioned to interrupt the application of pressure fluid to their respective actuator cylinders when the selected movement has been accomplished. Although each actuator is provided with its own control system and the rate of movement of the several actuator pistons in the multiple actuator system is not synchronized, it will be appreciated that due to the arrangement disclosed herein, the finite adjusted position of each actuator in the multiple actuator installation will be the same. That is, the control system of the present invention assures that equal movement of each actuator in the multiple actuator installation will be effected, without resort to a power transmitting interconnection between the actuators of the installation.

While the embodiment of the present invention as herein disclosed, constitutes a preferred form, it is to be understood that other forms might be adopted.

What is claimed is as follows:

1. An actuator assembly including in combination, a cylinder, a reciprocable piston disposed in said cylinder capable of fluid pressure actuation in either direction, a screw shaft rotatably supported in said cylinder and operatively connected to said piston so as to rotate in response to piston movement, mechanical locking means operatively associated with said screw shaft for preventing rotation thereof and hence locking said piston against movement, fluid pressure actuated means for releasing said locking means so as to permit piston movement, a first valve carried by said cylinder for applying pressure fluid to said lock releasing means, a second valve connected to said first valve and carried by said cylinder for controlling the application of pressure fluid to said cylinder on opposite sides of said piston, said second valve only being operable to apply pressure fluid to said cylinder after said first valve has applied pressure fluid to said lock releasing means, a rotatable cam, a follower carried by said second valve and engageable with said cam, resilient means acting on said second valve for maintaining said follower in engagement with said cam, said cam being integral with a planet carrier of a planetary gear set including a sun gear, a ring gear and a plurality of planet pinions supported by said planet carrier, manually operable means for effecting rotation of said ring gear relative to said sun gear for positioning said second valve, and means interconnecting said sun gear and said screw shaft for repositioning said second valve in response to movement of said piston.

2. An actuator assembly including in combination, a cylinder, a reciprocable piston disposed in the cylinder, fluid pressure releasable, mechanical locking means operatively connected with said piston for preventing movement thereof, the operative connection between said locking means and said piston including a member rotatably supported in said cylinder and operatively connected to said piston so as to rotate in response to piston reciprocation, a first valve for applying pressure fluid to the locking means so as to release said locking means and permit reciprocation of the piston, a second valve for controlling the application of fluid under pressure to opposite ends of said cylinder, conduit means interconnecting said first and second valves whereby said first valve controls the supply of fluid under pressure to said second valve, said first valve being pressure responsive so as to automatically effect a release of said locking means and supply fluid under pressure to said second valve when it is subjected to a predetermined pressure, and manually operable means for actuating the second valve.

3. The combination set forth in claim 2 wherein said actuator includes means operatively interconnecting the second valve and the rotatable member whereby a predetermined manual movement of said second valve will effect a predetermined movement of said actuator piston.

4. The combination set forth in claim 2 wherein said actuator includes a planetary gear set, the sun gear of which is operatively connected to the rotatable member and the planet carrier of which is operatively connected to said second valve for actuating the same.

5. The combination set forth in claim 2 wherein said actuator includes a planetary gear set including a sun gear, a ring gear, a plurality of planet pinions and a planet carrier, the sun gear being connected with said rotatable member, the planet carrier being operatively connected with the second valve, and the ring gear being operatively connected with the manually operable means.

References Cited in the file of this patent

UNITED STATES PATENTS

| | | | |
|---|---|---|---|
| 786,652 | Larsson | Apr. 4, | 1905 |
| 1,296,322 | Rushton | Mar. 4, | 1919 |
| 1,312,322 | Haiss | Aug. 5, | 1919 |
| 1,503,280 | Osbourne | July 29, | 1924 |
| 1,959,786 | Hodgkinson | May 22, | 1934 |
| 2,016,727 | Roth | Oct. 8, | 1935 |
| 2,105,473 | Dean | Jan. 18, | 1938 |
| 2,376,320 | Butrovich et al. | May 22, | 1945 |
| 2,526,252 | Mercier | Oct. 17, | 1950 |
| 2,572,902 | Ashton | Oct. 30, | 1951 |
| 2,667,146 | Wheeler | Jan. 26, | 1954 |
| 2,680,262 | Jorgensen | June 8, | 1954 |
| 2,730,994 | Light | Jan. 17, | 1956 |

FOREIGN PATENTS

| | | | |
|---|---|---|---|
| 61,867 | Netherlands | Oct. 15, | 1948 |
| 632,513 | Great Britain | Nov. 28, | 1949 |